(12) United States Patent
Pawliczek et al.

(10) Patent No.: US 10,793,288 B2
(45) Date of Patent: Oct. 6, 2020

(54) AIRCRAFT VERTICAL STABILIZER ILLUMINATION LIGHT AND METHOD OF OPERATING AN AIRCRAFT VERTICAL STABILIZER ILLUMINATION LIGHT

(71) Applicant: Goodrich Lighting Systems GmbH, Lippstadt (DE)

(72) Inventors: Carsten Pawliczek, Lippstadt (DE); Andreas Ueberschaer, Gütersloh (DE); Bjoern Schallenberg, Geseke (DE)

(73) Assignee: GOODRICH LIGHTING SYSTEMS GMBH, Lippstadt (DE)

( * ) Notice: Subject to any disclaimer, the term of this patent is extended or adjusted under 35 U.S.C. 154(b) by 0 days.

(21) Appl. No.: 16/362,893

(22) Filed: Mar. 25, 2019

(65) Prior Publication Data

US 2019/0322385 A1 Oct. 24, 2019

(30) Foreign Application Priority Data

Apr. 20, 2018 (EP) .................................... 18168516

(51) Int. Cl.
*H05B 45/10* (2020.01)
*B64D 47/02* (2006.01)
(Continued)

(52) U.S. Cl.
CPC ................ *B64D 47/02* (2013.01); *B64C 5/02* (2013.01); *G06T 7/13* (2017.01); *G06T 7/73* (2017.01);
(Continued)

(58) Field of Classification Search
CPC ...... B64D 47/02; B64D 2203/00; B64C 5/02; G06T 7/73; G06T 7/13; H05B 33/0854
See application file for complete search history.

(56) References Cited

U.S. PATENT DOCUMENTS 8,651,664 B2 * 2/2014 Harvey .................. G03B 29/00
353/13
9,324,248 B2 * 4/2016 Garrettson .............. G09F 21/08
(Continued)

FOREIGN PATENT DOCUMENTS

EP 2549329 A2 6/2012
EP 3106392 A1 12/2016

OTHER PUBLICATIONS

Extended European Search Report for International Application No. 18168516.5 dated Oct. 8, 2018, 5 pages.

*Primary Examiner* — Amy Cohen Johnson
*Assistant Examiner* — Jianzi Chen
(74) *Attorney, Agent, or Firm* — Cantor Colburn LLP

(57) ABSTRACT

An aircraft vertical stabilizer illumination light, the light includes a LED group, having a plurality of LEDs; an optical system, having at least one optical element, the optical system being associated with the LED group for shaping a light output from the light emitted by the LED group; an image generator, arranged within the aircraft vertical stabilizer illumination light for being oriented towards the vertical stabilizer, the image generator being configured to provide image data of the vertical stabilizer; and a controller, coupled to the image generator for receiving the image data; wherein the controller is configured to operate the aircraft vertical stabilizer illumination light in a plurality of operating modes.

12 Claims, 10 Drawing Sheets

(51) Int. Cl.
*G06T 7/73* (2017.01)
*G06T 7/13* (2017.01)
*B64C 5/02* (2006.01)

(52) U.S. Cl.
CPC ......... *H05B 45/10* (2020.01); *B64D 2203/00* (2013.01); *G06T 2207/30252* (2013.01)

(56) References Cited

U.S. PATENT DOCUMENTS

| | | |
|---|---|---|
| 9,751,635 B2 | 9/2017 | Heuer et al. |
| 10,336,468 B2 * | 7/2019 | Lueder ..................... B64C 5/16 |
| 2006/0038381 A1 * | 2/2006 | Gehring .................. B60D 1/36 |
| | | 280/477 |
| 2006/0264258 A1 * | 11/2006 | Zalewski .............. A63F 13/211 |
| | | 463/36 |
| 2007/0147055 A1 | 6/2007 | Komatsu |
| 2016/0368621 A1 * | 12/2016 | Lueder ............... B64D 45/0005 |
| 2017/0228881 A1 | 8/2017 | Zakrzewski et al. |

\* cited by examiner

AIRCRAFT VERTICAL STABILIZER ILLUMINATION LIGHT AND METHOD OF OPERATING AN AIRCRAFT VERTICAL STABILIZER ILLUMINATION LIGHT

FOREIGN PRIORITY

This application claims priority to European Patent Application No. 18168516.5 filed Apr. 20, 2018, the entire contents of which is incorporated herein by reference.

TECHNICAL FIELD

The present invention is in the field of exterior aircraft lighting. In particular, the present invention relates to light for the illumination of the vertical stabilizer at the tail of an aircraft. Such light are sometimes also referred to as logo lights.

BACKGROUND

Large commercial aircraft have many different exterior lights. An exemplary group of exterior aircraft lights are lights for passive visibility, such as navigation lights and anti-collision lights. Another exemplary group of exterior aircraft lights are headlights that allow the pilots to view the area in front of them, when they are seated in the cockpit, such as taxi lights, take-off lights, landing lights, and runway turn-off lights. Yet another example of exterior aircraft lights are scan lights that allow the inspection of the aircraft structure in the dark, such as wing scan lights.

Light for illuminating the vertical stabilizer at the tail of an aircraft have a number of purposes. First, they allow for an inspection of the vertical stabilizer in the dark, such as during an operational check of the rudder. Second, they allow for providing an indication of the extension of the aircraft in the dark, because the illuminated area is a good estimate of where the tail end of the aircraft is. Third, they help in identifying aircraft during the approach or during taxiing on the air field, because the vertical stabilizer commonly contains an airline logo. For this reason, the vertical stabilizer illumination lights are often also referred to as logo lights.

An exemplary tail of an aircraft 100 is shown in FIG. 1. The aircraft 100 has two horizontal stabilizers, one of them being shown in the viewing direction of FIG. 1 and being indicated with reference numeral 102. Further, the aircraft 100 has a vertical stabilizer 104, mounted to the top of the fuselage of the aircraft 100. The horizontal stabilizer 102 comprises a vertical stabilizer illumination light that emits light towards the vertical stabilizer 104 for illuminating the same. In FIG. 1, there is depicted a circle 150 that illustrates an illumination cone representing the area illuminated by a prior art vertical stabilizer illumination light. As can be seen from FIG. 1, the illumination cone 150 illuminates a large portion of the vertical stabilizer 104. However, it also emits a large amount of light that passes the vertical stabilizer 104 and is, therefore, not used for the illumination of the vertical stabilizer 104. In other words, such a prior art vertical stabilizer illumination light emits a large amount of "wasted" light.

Accordingly, it would be beneficial to provide an aircraft vertical stabilizer illumination light that has an improved light usage efficiency.

SUMMARY

Exemplary embodiments of the invention include an aircraft vertical stabilizer illumination light, configured for being arranged in a rotatable horizontal stabilizer of an aircraft and for being oriented towards a vertical stabilizer of the aircraft for illuminating the vertical stabilizer, comprising a LED group, comprising a plurality of LEDs; an optical system, comprising at least one optical element, the optical system being associated with the LED group for shaping a light output from the light emitted by the LED group; an image generator, arranged within the aircraft vertical stabilizer illumination light for being oriented towards the vertical stabilizer, the image generator being configured to provide image data of the vertical stabilizer; and a controller, coupled to the image generator for receiving the image data; wherein the controller is configured to operate the aircraft vertical stabilizer illumination light in a plurality of operating modes, with different sets of the plurality of LEDs being switched on in the plurality of operating modes and with different light outputs being emitted by the aircraft vertical stabilizer illumination light in the plurality of operating modes, and wherein the controller is configured to select a particular operating mode in response to the image data received.

Exemplary embodiments of the invention allow for a reduction of the waste light by making the light output of the aircraft vertical stabilizer illumination light dependent on the image data of the vertical stabilizer. The image data of the vertical stabilizer changes during the operation of the aircraft, in particular due to the rotation of the rotatable horizontal stabilizer. The vertical stabilizer has a different position and/or orientation in the field of view of the image generator, when the horizontal stabilizer rotates. This is due to the fact that the relative position between the aircraft vertical stabilizer light, being arranged in the rotatable horizontal stabilizer, and the vertical stabilizer changes with the rotation of the horizontal stabilizer. Accordingly, the image data generated by the image generator and provided to the controller contains information about the relative position of the vertical stabilizer with respect to the aircraft vertical stabilizer illumination light. Making the selection of the operating mode dependent on the image data, containing said information, allows for choosing a particular operating mode that provides for a good illumination of the vertical stabilizer, while producing a low amount of wasted light, in accordance with the current operating conditions of the rotatable horizontal stabilizer.

As compared to prior approaches, which provide for such a light output that the vertical stabilizer was illuminated for all possible rotation angles of the horizontal stabilizer, the aircraft vertical stabilizer illumination light in accordance with exemplary embodiments of the invention takes into account the current relative positioning between the aircraft vertical stabilizer illumination light and the vertical stabilizer and adjusts the light output as a response thereto. In this way, it can be achieved that the vertical stabilizer is fully illuminated, while at the same time reducing the waste light passing the vertical stabilizer and not illuminating the same. While the prior art has accounted for the rotation of the horizontal stabilizer, to which the light is mounted, by providing a wide light output, leading to a large amount of waste light, exemplary embodiments of the invention adjust the output light intensity distribution as a response to the image data, which contains information about the rotation angle of the horizontal stabilizer, and are, thus, able to reduce the waste light. This in turn may lead to a reduced power consumption and/or to a higher lifetime and/or an optimized uniform illumination of the vertical stabilizer for different rotation angles of the horizontal stabilizer. In particular, via the plurality of operating modes, the illumination of the vertical stabilizer can be optimized individually for different rotation angles of the horizontal stabilizer, which are also referred to as trim angles. Further, exemplary embodiments of the invention may reduce the amount of white light passing by the front edge of the vertical stabilizer. Reducing this portion of light passing the vertical stabilizer may be particularly beneficial, because this white light may interfere with the red/green light, emitted by the position lights of the aircraft, thus potentially confusing other pilots.

As compared to prior approaches, which are adaptive with respect to the operating condition of the horizontal stabilizer, the provision of an image generator and the selection of the particular operating mode in response to the image data allow for a very robust/reliable adaptation of the light output to the present illumination needs. As compared to prior approaches that rely on selecting a particular operating mode on the basis of the control command for the horizontal stabilizer, as issued by the pilot and/or autopilot, exemplary embodiments of the present invention allow for a determination of a suitable operating mode with only the information generated within the aircraft vertical stabilizer illumination light. This is particularly reliable, because the actual relative positioning is used and not an assumed relative positioning due to the control command for the horizontal stabilizer. Also, the present approach is not sensitive to any signal corruption between the cockpit/board computer and the aircraft vertical stabilizer illumination light. As compared to prior approaches that rely on the measurement/sensing of the rotation angle of the horizontal stabilizer, exemplary embodiments of the present invention allow for a particularly robust determination of a suitable operating mode. The image data provides very immediate information about the position/orientation of the vertical stabilizer with respect to the aircraft vertical stabilizer illumination light. The image data is an immediate measure of the relative positioning. Also, the image data, which can be seen as a two-dimensional array of measurement values, contains a large amount of information about the relative positioning, with that large amount of information containing a substantial amount of redundancy and, thus, forming a good basis for a reliable selection of a suitable operating mode. In this way, the selection of a suitable operating mode is more robust as compared to an approach relying on one measurement value, such as a sensed rotation angle of the horizontal stabilizer. Also, using image data is less sensitive to measurement errors, because sensing a rotation angle is not straightforward in the highly complex system of a flying aircraft, which is subject to a variety of external forces.

According to a further embodiment, the LED group and the optical system are stationary within the aircraft vertical stabilizer illumination light, with each LED of the LED group having a set position with respect to the optical system. In this way, a very robust optical structure is provided. The set position of the plurality of LEDs and the optical system within the aircraft vertical stabilizer illumination light eliminates the need for mechanical actuators for the light sources and/or for the optical system. A particularly robust light architecture, well-suited for the demanding aircraft environment, may thus be achieved.

According to a further embodiment, the image generator is stationary within the aircraft vertical stabilizer illumination light. With the image generator being stationary, the field of view of the image generator stays unchanged in the frame of reference of the aircraft vertical stabilizer illumination light. Accordingly, the changes in the image data are due to the changes in the relative positioning of the vertical stabilizer and the aircraft vertical stabilizer illumination light and the changes in the relative positioning can be detected without interfering effects from a positional change of the image generator within the aircraft vertical stabilizer illumination light.

According to a further embodiment, at least some of the plurality of LEDs are independently controllable. The plurality of operating modes may be achieved via switching on/off different sets of the plurality of LEDs. As compared to moving light sources and/or moving optical systems, this approach is beneficial, as it does not require mechanical actuators for adjusting the light output. The selection of a particular operating mode and the driving of the associated set of the plurality of LEDs for the given operating mode is a purely electrical procedure, not relying on any mechanical actuation. This leads to a high reliability of the aircraft vertical stabilizer illumination light and, thus, to low maintenance requirements. The wording of at least some of the plurality of LEDs being independently controllable means that a more granular control of the LEDs is possible, as compared to a fully joint control of the plurality of LEDs. It is possible that each of the plurality of LEDs is individually controllable. However, it is also possible that some LEDs or some groups of LEDs are individually controllable, while other LEDs are jointly controllable. For example, it is possible that a particular subgroup of LEDs is operated in all of the operating modes. In this case, it is possible that they are only jointly controllable. However, at least some of the LEDs are operated in a particular operating mode/particular operating modes, while not being operated in other operating modes. Accordingly, at least these LEDs are controllable in an independent manner, as compared to the other LEDs.

Different sets of the plurality of LEDs are switched on in the plurality of operating modes. As a consequence, different light outputs are emitted by the aircraft vertical stabilizer illumination light in the plurality of operating modes. When seen from the outside of the aircraft vertical stabilizer illumination light, the plurality of operating modes differ from each other in the light output leaving the aircraft vertical stabilizer illumination light. The plurality of operating modes may differ with respect to the emitted light intensity across various output directions. In other words, the aircraft vertical stabilizer illumination light produces different output light intensity distributions in the different operating modes. When looking at the internal function of the aircraft vertical stabilizer illumination light, the plurality of operating modes differ from each other with respect to the respective sets of LEDs being switched on. The term set of LEDs may refer to any group of the plurality of LEDs. A particular set may consist of all LEDs, while other sets may consist of subgroups of LEDs, while yet other sets may consist of single LEDs, respectively. For a particular operating mode, the optical system shapes a particular light output from the light emitted by the LED(s) being switched on, i.e. the optical system transforms the light intensity distribution, as emitted by the LED(s) being switched on, into an associated output light intensity distribution.

The controller is configured to select a particular operating mode in response to the image data received. The controller may select the particular operating mode on the basis of the information contained in the image data. In other words, the controller may perform image analysis on the image data, compare the results of said image analysis with reference data, and select the particular operating mode on the basis of these operations. The term image data refers to any kind of encoded version of an image. For example, the image data may be represented as a two-dimensional array, i.e. as per pixel data. It is also possible that the image data is represented transformed into the frequency domain. In general, the image data may be represented in any kind of encoded format that allows for the performing of signal processing thereon by the controller. The image generator is a device that is capable of capturing an image of the vertical stabilizer, it may also be referred to as an image capturing device.

The controller may be a hardware circuit or a software program, running for example on a microprocessor, or a combination of the two. The controller may comprise a look-up table and/or an algorithm that determines the selection of the particular operating mode in response to the extraction of particular information from the image data. The look-up table and/or the algorithm may contain the information which operating mode leads to a particularly good illumination of the vertical stabilizer for the given image as seen by the image generator and as provided via the image data.

According to a further embodiment, the image generator comprises a camera. In particular, the image generator may be a camera. The camera may be a digital camera. Using a camera as the image generator is a convenient way of generating image data for a desired field of view in a format that can be processed well downstream. The field of view may contain the vertical stabilizer or portions thereof and may, optionally, contain an area around the vertical stabilizer.

According to a further embodiment, the image generator comprises a laser scanner and/or an ultrasonic scanner. Both laser scanners and ultrasonic scanners are able to produce an image representation of the field of view in front of them. In particular, the laser scanner/ultrasonic scanner may be configured to scan the field of view in a two-dimensional manner. The field of view may contain the vertical stabilizer or portions thereof and may, optionally, contain an area around the vertical stabilizer.

According to a further embodiment, the controller comprises an object detection unit configured to detect at least one object in the image data received. In general, any characteristic object may be detected in the image data. For example, an object to be detected may be a color step or a brightness step, in particular an extended color or brightness step, such as an edge. An object to be detected may also be a particular color or particular color range, for example in the case the vertical stabilizer has a certain color. It is also possible that a particular color in a particular area of the image data is the object to be detected. It is also possible to detect particular shapes, such as the outline of the vertical stabilizer or a particular airline logo on the vertical stabilizer. It is also possible that the object to be detected is the combination of a particular shape and a particular color, etc. The detected at least one object may form the basis for determining the current relative positioning between the aircraft vertical stabilizer illumination light and the vertical stabilizer. The controller may be configured to select the particular operating mode on the basis of the detected at least one object, in particular on the basis of the position and/or orientation of the at least one object. The object detection unit may be a hardware component or a software component, such as a software filter, or any combination of hardware and software.

According to a further embodiment, the object detection unit is configured to perform edge detection on the image data received. Edge detection has been found to be a particularly useful form of object detection for the vertical stabilizer. In particular, the front edge and/or rear edge and/or top edge of the vertical stabilizer may be detected in a highly reliable manner, as they often provide a good contrast to the surrounding sky or clouds. This edge detection of the edges of the vertical stabilizer may also be thought of as an outline detection of the vertical stabilizer. Also, edge detection is particularly useful, because the detected edges are substantially linear features, whose rotation angle can be detected well. Edge detection may be performed via at least one of the Canny algorithm, the Sobel operator, and the Laplace filter. Other edge detection algorithms are possible as well.

According to a further embodiment, the object detection unit is configured to detect a rotation angle indication from the detected at least one object, the rotation angle indication indicating a rotation angle of the rotatable horizontal stabilizer. Further, the controller may be configured to select the particular operating mode in response to the rotation angle indication. The rotation angle indication may be a measure for the rotation angle of the horizontal stabilizer itself. It is also possible that the rotation angle indication is a value related to the rotation angle of the horizontal stabilizer, e.g. related via trigonometric and/or other transformations/functions. In particular, the rotation angle indication may be an angle value. For example, the rotation angle indication may be determined on the basis of the angle of a given edge determined via edge detection. The angle of a given edge of the vertical stabilizer may be a unique identifier of the rotation angle of the horizontal stabilizer, depending on the geometry of the horizontal stabilizer and the outline of the path of the aircraft vertical stabilizer illumination light during the rotation of the horizontal stabilizer. Determining the rotation angle indication as a single parameter for the current relative positioning between the aircraft vertical stabilizer illumination light and the vertical stabilizer allows for the selection of the particular operating mode in a convenient manner via a simple look-up table or simple function.

According to a further embodiment, the object detection unit is configured to determine the rotation angle indication on the basis of the position and/or orientation of the at least one object in the image data with respect to a reference position and/or a reference orientation of the at least one object in reference image data. In particular, the object detection unit may be configured to determine the rotation angle indication on the basis of the position and/or orientation of at least one detected edge with respect to/in comparison with a reference position and/or reference orientation of the at least one detected edge. The reference position and/or reference orientation may refer to the position and/or orientation of the at least one object, when the horizontal stabilizer is in a reference position, such as the untrimmed default flight position.

According to a further embodiment, the controller is configured to select the particular operating mode in such a way that substantially the entire vertical stabilizer of the aircraft is illuminated for a given rotation angle of the rotatable horizontal stabilizer within a predefined rotation angle range. In other words, the aircraft vertical stabilizer light is able to select, for any given rotation angle of the horizontal stabilizer in a predefined rotation angle range, an operating mode and, thus, a respective set of the plurality of LEDs whose light emission results in a light output that illuminates substantially the entire vertical stabilizer of the aircraft.

According to a further embodiment, the predefined rotation angle range covers an angular range of at least 10°, in particular an angular range of between 10° and 20°. In this way, the aircraft vertical stabilizer illumination light is able to account for common rotation angles of horizontal stabilizer of large commercial aircraft. For example, the predefined rotation angle range may include rotation angles of between −14° and 4°. In another example, the predefined rotation angle range may include rotation angles of between −6° and 4°. In yet another example, the predefined rotation angle range may include rotation angles of between −10° and 2.5°.

According to a further embodiment, for each of the plurality of operating modes, the respective set of the plurality of LEDs emits light illuminating a respective illumination sector of a vertical plane through the vertical stabilizer, with the respective illumination sector being less than 150%, in particular less than 120%, further in particular less than 110%, in area, as compared to the vertical stabilizer. In other words, for an imaginary vertical plane running through the vertical stabilizer of the aircraft, the illumination sector of any one of the plurality of operating modes has an extension that is less than 150%, in particular less than 120%, further in particular less than 110%, of the extension of the vertical stabilizer. In yet other words, the area of the illumination sector is less than 50%, in particular less than 20%, further in particular less than 10%, larger than the area of the vertical stabilizer. In this way, the vast majority of the light, leaving the aircraft vertical stabilizer illumination light, is actually used for illuminating the vertical stabilizer, with only a small portion of the emitted light passing the vertical stabilizer and not contributing to the illumination thereof.

According to a further embodiment, the respective illumination sector substantially corresponds in area to the vertical stabilizer. In other words, the area of the imaginary vertical plane illuminated by the aircraft vertical stabilizer illumination light is substantially the same as the area of the vertical stabilizer. In yet other words, substantially all of the light emitted by the aircraft vertical stabilizer illumination light reaches the vertical stabilizer and illuminates the same. In this way, the light usage efficiency may be even further optimized.

According to a further embodiment, the plurality of operating modes comprises a reference operating mode for illuminating the vertical stabilizer with a reference light output, when the rotatable horizontal stabilizer is in a reference position, and a plurality of adjusted operating modes, having respective adjusted light outputs, wherein each of the adjusted light outputs compensates for a particular rotation of the aircraft vertical stabilizer illumination light. In this way, the vertical stabilizer may be illuminated in the reference operating mode, when the rotatable horizontal stabilizer is in its most common position, such as the position on the ground or a cruise flight position, while the adjusted operating modes may be used during flight phases that are commonly associated with extended rotations of the horizontal stabilizer, such as start and landing phases of the flight. The adjusted operating modes may have adjusted light outputs that lead to a very similar or even substantially the same illumination of the imaginary vertical plane through the vertical stabilizer, discussed above. In particular, the light outputs of the reference operating mode and the adjusted operating modes may have an overlap of more than 95% in the vertical plane through the vertical stabilizer, when the light unit is installed in the horizontal stabilizer and the adjusted operating modes are used at the respective particular rotations of the aircraft vertical stabilizer illumination light.

According to a further embodiment, the different sets of LEDs of the plurality of operating modes are different to such an extent that not all the switched on LEDs of a particular operating modes are switched on in any of the other operation modes. In other words, any two operating modes may differ in at least one additional switched on LED and at least one additional switched off LED in one operating mode as compared to the other.

According to an alternative embodiment, the different sets of LEDs of the plurality of operating modes may comprise subsets of switched on LEDs. In other words, two operating modes may differ from each other in that the set of switched on LEDs of one operating mode contains all switched on LEDs of the other operating mode and has at least one additional switched on LED. For example, a particular set of LEDs may be switched on for a reference operating mode, associated with the reference position of the horizontal stabilizer. In further operating modes, one or more additional LEDs may be switched on, with the LEDs of the reference operating mode also being switched on. In particular, one or more first additional LEDs may be switched on for a forward rotation of the horizontal stabilizer, while one or more second additional LEDs may be switched on for a rearward rotation of the horizontal stabilizer. As only the one or more first additional LEDs or the one or more second additional LEDs will be switched on in operation, the first and second additional LEDs may be integrated into a joint optical system in an efficient manner, in particular with respect to space, wiring, and power supply requirements. In particular, they may be integrated into a dual or multi focal optical system.

According to a further embodiment, each of the plurality of operating modes has a vertical light output opening angle, based on a height extension of the vertical stabilizer, and a horizontal light output opening angle, based on a length extension of the vertical stabilizer, with a combined horizontal light output opening angle of all of the plurality of operating modes being 5° to 20°, in particular 10° to 15°, larger than the horizontal light output opening angle of each one of the plurality of operating modes. In other words, the horizontal light output opening angles of the different operating modes are offset with respect to each other in the light unit frame of reference, i.e. the different operating modes have different output light intensity distributions that cover different horizontal sectors, as seen from the light unit. In this way, it can be achieved that the light output of the aircraft vertical stabilizer illumination light is similar or even the same in the aircraft frame of reference for the different operating modes, although the rotation of the horizontal stabilizer rotates the aircraft vertical stabilizer light in the aircraft frame of reference. The overall larger horizontal opening angle of the combined output light intensity distribution of all operating modes, as compared to the individual operating modes, allows for a selection of an appropriate operating mode that provides a horizontal opening angle that corresponds to the position of the vertical stabilizer for the given orientation of the aircraft vertical stabilizer illumination light. The horizontal light output opening angles of the different operating modes may overlap.

The vertical light output opening angle and the horizontal light output opening angle may be dependent on the type of aircraft and on the mounting distance between the aircraft vertical stabilizer illumination light and the vertical stabilizer. In particular, both the vertical light output opening angle and the horizontal light output opening angle of the operating modes may be chosen in dependence of the height extension of the vertical stabilizer, the length extension of the vertical stabilizer, and the distance between the aircraft vertical stabilizer illumination light and the vertical stabilizer. The particular opening angles and the particular shapes of the light outputs may be reached on the basis of the geometric conditions present in a particular setting. The horizontal and vertical light output opening angles may be measured for a reference position. For example, the horizontal light output opening angle may be measured for a horizontal line extending through the center of the vertical stabilizer in a height-wise direction. For example, the vertical light output opening angle may be measured for a vertical line extending through the center of the vertical stabilizer in a length-wise direction. The terms vertical and horizontal refer to the vertical and horizontal directions, when the aircraft vertical stabilizer illumination light is installed in an aircraft and the aircraft is stationary on the ground. In the light unit frame of reference, the vertical and horizontal light output opening angles are opening angles in two orthogonal planes, running through the aircraft vertical stabilizer illumination light.

According to a further embodiment, for each of the plurality of operating modes, a vertical light opening angle is between 70° and 90°, in particular between 80° and 85°, and/or wherein, for each of the plurality of operating modes, a horizontal light opening angle is between 70° and 110°. In this way, the aircraft vertical stabilizer illumination light is able to illuminate the vertical stabilizer of common large commercial aircraft. The vertical and horizontal opening angles may be adapted to a particular type of aircraft, depending on the extensions of the vertical stabilizer and the distance between the aircraft vertical stabilizer illumination light and the vertical stabilizer.

The selection of a particular operating mode may also be referred to as beam steering. The output beam of the aircraft vertical stabilizer illumination light may be steered towards the vertical stabilizer by selecting a particular operating mode that provides for illumination in the direction of the vertical stabilizer.

According to a further embodiment, the aircraft vertical stabilizer illumination light has one optical system associated with the plurality of LEDs. The individual light outputs by the plurality of LEDs are affected differently by the one optical system due to their different positioning with respect thereto. In this way, a high integration and low overall space requirements for the aircraft vertical stabilizer illumination light can be achieved. The LEDs are all associated with the one optical system, i.e. only one optical system is present that shapes the output light intensity distribution. Having different positions, each of the LEDs is affected differently by the optical system and, thus, contributes to the output light intensity in a different manner. By operating respective sets of the LEDs, the different light outputs of the different operating modes can be achieved.

According to an alternative embodiment, the aircraft vertical stabilizer illumination light has a plurality of optical arrangements, with each optical arrangement comprising at least one of the plurality of LEDs and an associated optical sub-system and with at least some of the plurality of optical arrangements having differing orientations towards the vertical stabilizer and being independently operable. In this way, optical arrangements are provided that may be designed independently from each other. Each optical arrangement may be optimized for a particular contribution to the light output. In this way, the light output may be the result of the combined operation of different optical arrangements, which may lead to a more optimized illumination of the vertical stabilizer across the different operating modes. This approach may lead to more degrees of freedom in the design of the aircraft vertical stabilizer illumination light for a particular application. In particular, it may be possible to design an aircraft vertical stabilizer illumination light in this way that can be used for a large variety of aircraft types. It is possible that each optical arrangement has exactly one LED. However, it is also possible that there are multiple optical arrangements, as described above, and that each or some of the multiple optical arrangements have several LEDs contained therein. In this way, an optimized compromise between highly accurate light output and low space requirements may be achieved.

Exemplary embodiments of the invention further include an aircraft, having in a tail portion of the aircraft a vertical stabilizer, a left rotatable horizontal stabilizer and a right rotatable horizontal stabilizer, wherein each of the left rotatable horizontal stabilizer and the right rotatable horizontal stabilizer comprises an aircraft vertical stabilizer illumination light, as described in any of the embodiments above, oriented towards the vertical stabilizer for illumination thereof. In particular, each of the aircraft vertical stabilizer illumination lights may emit a light output that is generally transverse to the aircraft fuselage. In particular, the aircraft vertical stabilizer illumination lights may emit a light output that has a vertical opening angle and a horizontal opening angle around an output direction that is in a plane orthogonal to the longitudinal extension of the aircraft fuselage. It can also be said that the general orientation of the aircraft vertical stabilizer illumination lights may be in a plane orthogonal to the aircraft fuselage. The additional features, modifications and effects, described above with respect to the aircraft vertical stabilizer illumination light, are also applicable to the aircraft and are explicitly disclosed herewith in the context of the aircraft.

Exemplary embodiments of the invention further include a method of operating an aircraft vertical stabilizer illumination light, installed in a rotatable horizontal stabilizer of an aircraft for illuminating a vertical stabilizer of the aircraft. The method comprises the steps of generating image data of the vertical stabilizer, and selecting a particular operating mode of the aircraft vertical stabilizer illumination light in response to the image data received, the particular operating mode being selected from a plurality of operating modes, with different light outputs being emitted by the aircraft vertical stabilizer illumination light in the plurality of operating modes. This method allows for illuminating the vertical stabilizer on the basis of the image of the vertical stabilizer as currently seen from the aircraft vertical stabilizer illumination light. In this way, at least one of a high illumination coverage of the vertical stabilizer, a high light usage efficiency, low power consumption, and a high lifetime of the light unit may be achieved. The additional features, modifications and effects, described above with respect to the aircraft vertical stabilizer illumination light, are equally applicable to the method of operating an aircraft vertical stabilizer illumination light. Analogous method steps are explicitly disclosed herewith.

According to a further embodiment, the method further comprises the step of detecting at least one object in the image data received. Detection of particular object(s) allows for efficiently deducing the relative positioning and orientation between the vertical stabilizer and the aircraft vertical stabilizer illumination light. The method may further comprise the step of selecting the particular operating mode on the basis of the at least one objected detected in the image data, in particular on the basis of the position and/or orientation of the at least one object detected in the image data.

According to a further embodiment, the method further comprises the step of determining a rotation angle indication from the at least one object, the rotation angle indication indicating a rotation angle of the rotatable horizontal stabilizer. The determining of the rotation angle indication may comprise relating of the position and/or orientation of the at least one object with a reference position and/or a reference orientation of the at least one object in reference image data. The method may further comprise the step of selecting the particular operating mode on the basis of the rotation angle indication.

According to a further embodiment, the method comprises the steps of selecting a reference operating mode, having a reference light output for illuminating substantially the entire vertical stabilizer, when the rotatable horizontal stabilizer is in a reference position, and selecting one of a plurality of adjusted operating modes, each having an adjusted light output, as a response to the rotatable horizontal stabilizer being rotated from the reference position by a particular rotation angle, wherein each of the plurality of adjusted light outputs compensates for a respective particular rotation angle of the aircraft vertical stabilizer illumination light, such that substantially the entire vertical stabilizer is illuminated in each of the plurality of adjusted operating modes.

According to a further embodiment, the aircraft vertical stabilizer illumination light comprises a plurality of LEDs and the method comprises the step of switching on, for each of the plurality of operating modes, a respective set of the plurality of LEDs for illuminating the vertical stabilizer.

BRIEF DESCRIPTION OF DRAWINGS

Further exemplary embodiments of the invention are described with respect to the accompanying drawings, wherein.

DETAILED DESCRIPTION

Figure 2:
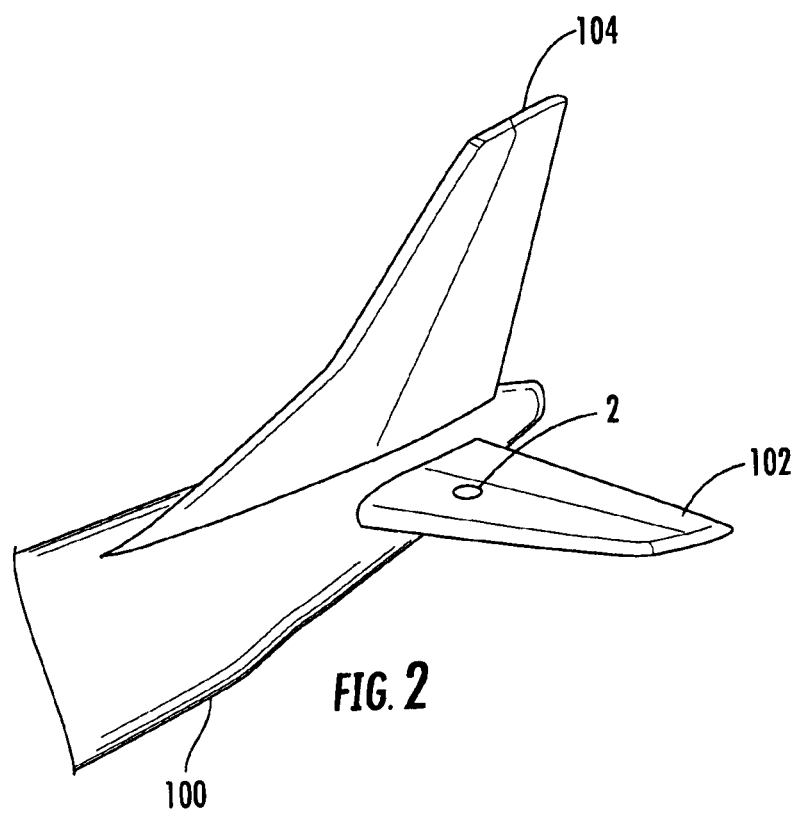
FIG. 2 shows an aircraft tail in a perspective view, with an aircraft vertical stabilizer illumination light in accordance with exemplary embodiments of the invention being arranged in the horizontal stabilizer.

FIG. 2 shows a tail portion of an aircraft 100 in a perspective view. In the perspective view of FIG. 2, a left rotatable horizontal stabilizer 102 and a vertical stabilizer 104 are shown, which are mounted to the fuselage of the aircraft 100. The left rotatable horizontal stabilizer 102 comprises an aircraft vertical stabilizer illumination light 2 in accordance with exemplary embodiments of the invention. The aircraft vertical stabilizer illumination light 2 is disposed on the upper side of the left rotatable horizontal stabilizer 102. It is arranged within the body of the left rotatable horizontal stabilizer 102 and has a cover that is flush with the upper surface of the left rotatable horizontal stabilizer 102. The aircraft vertical stabilizer illumination light 2 in operation emits light through the cover towards the vertical stabilizer 104 and illuminates the same. As will be explained in detail below, the aircraft vertical stabilizer illumination light 2 adjusts its light output as a response to a rotation of the left rotatable horizontal stabilizer 102.

Figure 3A:
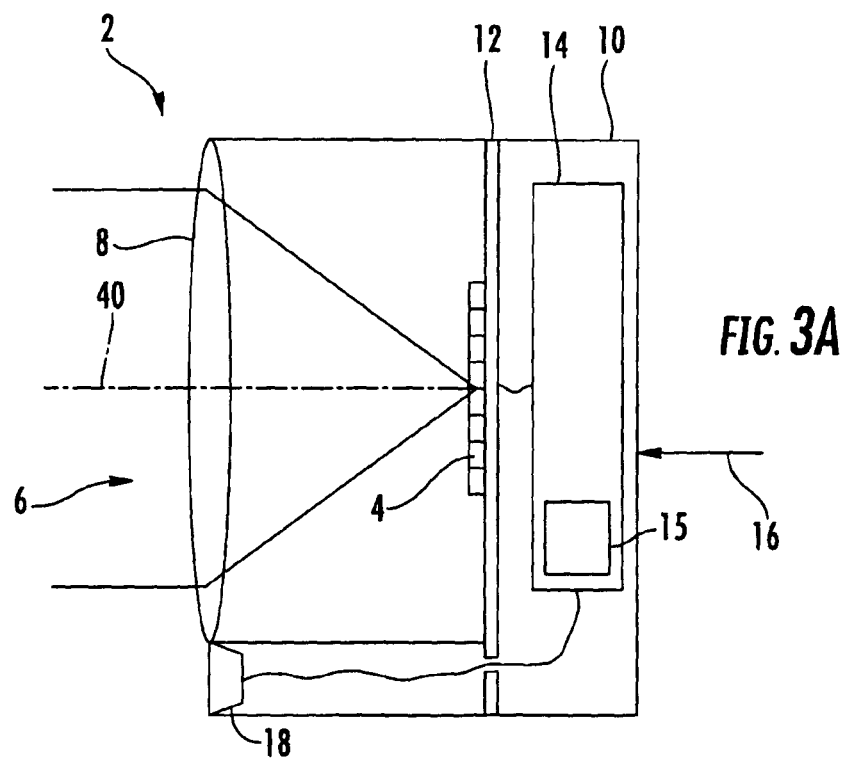
FIG. 3A shows a schematic illustration of an aircraft vertical stabilizer illumination light in accordance with exemplary embodiments of the invention.

FIG. 3A shows a schematic illustration of an aircraft vertical stabilizer illumination light 2 in accordance with an exemplary embodiment of the invention. The aircraft vertical stabilizer illumination light 2 comprises a housing 10, whose inner space is separated into two parts by a mounting plate 12. Attached to the mounting plate 12, there is provided a LED group 4. The LED group 4 comprises a two-dimensional array of LEDs, one row of which is shown in the schematic illustration of FIG. 3A. The depicted row consists of eight individual LEDs arranged in a linear configuration in the exemplary embodiment. It is pointed out that a two-dimensional array of LEDs is an exemplary embodiment of an LED group. It is also possible that the plurality of LEDs are arranged differently, such as in another regular pattern or also in a non-regular pattern. Further, it is possible that the arrangement of the plurality of LEDs is not planar. For example, the arrangement of the plurality of LEDs may comprise LED positions that are behind and/or in front of a reference plane.

The aircraft vertical stabilizer illumination light 2 further comprises an optical system 6. In the exemplary embodiment of FIG. 3A, the optical system 6 consists of a lens 8. The optical system may also have additional optical elements, such as one or more additional lenses, reflectors, and shutters. In operation, the LEDs of the LED group 4 emit light towards the lens 8 of the optical system 6.

The aircraft vertical stabilizer illumination light 2 further comprises a camera 18, which is an exemplary image generator. The camera is generally aligned with the light output direction of the aircraft vertical stabilizer illumination light 2. While the light output is adjusted depending on the rotation of the horizontal stabilizer, as will be explained below, the orientation of the camera 18 stays the same in all operating conditions in the exemplary embodiment of FIG. 2. The camera 18 is arranged within the housing 10 in such a way that it is oriented towards the vertical stabilizer when the aircraft vertical stabilizer illumination light 2 is mounted to the horizontal stabilizer. In operation, the camera 18 generates image data of the vertical stabilizer and its surroundings. It is pointed out that other image generators, such as a laser scanner or an ultrasonic scanner, can be used as an alternative to the camera 18 or as an additional image generator for redundancy and/or complementary purposes. The camera 18 may be arranged in any position in or around the housing 10 where it has a substantially unobstructed field of view towards the vertical stabilizer. Even if the camera 18 is arranged outside the housing 10, it is still considered a functional part of the aircraft vertical stabilizer illumination light 2.

On the other side of the mounting plate 12, there is provided a controller 14. The controller 14 is coupled to a power input 16. In this way, the controller 14 receives power from an external power source, such as the aircraft power network, via the power input 16. The controller 14 further receives image data from the camera 18 via an according data line or in a wireless manner. The controller 14 is further coupled to the LED group 4 and controls each of the LEDs of the LED group 4 individually in the exemplary embodiment of FIG. 3A. In particular, the controller 14 is configured to decide which ones of the LEDs of the LED group 4 are switched on/off in response to the image data received from the camera 18, as will be explained in detail below. The controller 14 uses the power provided via the power input 16 both for its own operation and for the driving of the LED group 4. For driving the LEDs, the controller 14 has suitable driving circuitry.

The controller 14 is configured to select a particular operating mode out of a plurality of different operating modes in response to the image data received from the camera 18. In the exemplary embodiment of FIG. 3A, the controller 14 has an object detection unit 15, which is configured to detect at least one object in the image data received from the camera 18. On the basis of the position and/or orientation of the detected at least one object, the controller 14 selects the particular operating mode. This will be illustrated in detail below. Based on the selection of the particular operating mode that is considered suitable in a particular operating condition, the controller 14 is configured to selectively switch a predefined set of the LEDs of the LED group 4 on, the predefined set of the LEDs of the LED group being associated with the particular operating mode.

Figure 3B:
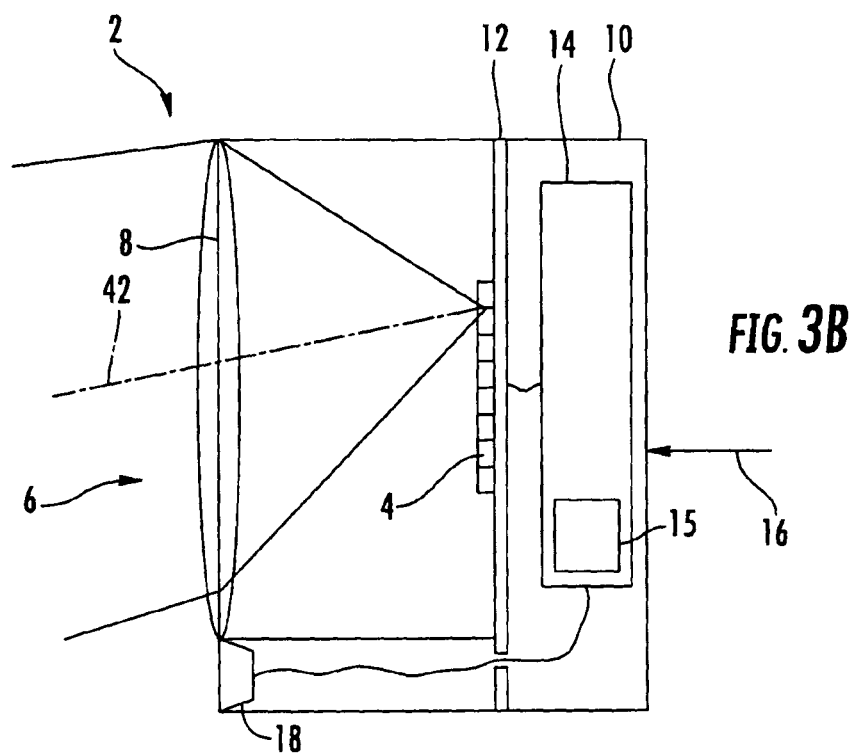
FIG. 3B shows a schematic illustration of an aircraft vertical stabilizer illumination light in accordance with exemplary embodiments of the invention.

In FIG. 3A, a first illustrative operating mode of the aircraft vertical stabilizer illumination light 2 is shown. In the first illustrative operating mode, the two center LEDs of the shown portion of the LED group 4 are switched on, i.e. the two center LEDs emit light in the first illustrative operating mode. As can be seen from the depicted three exemplary light rays, the lens 8 substantially collimates the light emitted by the LEDs and outputs said light in a first main light emission direction 40. In FIG. 3B, a second illustrative operating mode of the aircraft vertical stabilizer illumination light 2 of FIG. 3A is shown. In particular, in the second illustrative operating mode, the top two LEDs of the shown portion of the LED group 4 are switched on. The light emitted by the two top LEDs of the LED group 4 is transformed into a light output of the second illustrative operating mode by the lens 8. As can be seen from the three depicted exemplary light rays, the light of the top two LEDs of the LED group 4 results in a light output that is angled somewhat towards the bottom in the drawing plane of FIG. 3B. The main light emission direction 42 of the light output of the second illustrative operating mode is slightly angled towards the bottom in the drawing plane of FIG. 3B.

From the comparison of FIG. 3A and FIG. 3B, it can be seen that each of the LEDs of the LED group 4 has a different contribution to the overall light output of the aircraft vertical stabilizer illumination light 2. It is apparent that a wide variety of output light intensity distributions can be achieved by operating different sets of the LEDs of the LED group 4. Accordingly, various different operating modes of the aircraft vertical stabilizer illumination light 2 with different light outputs can be achieved by operating different sets of LEDs.

The exemplary aircraft vertical stabilizer illumination light 2 of FIG. 3 is configured to have a plurality of operating modes, with the light output of each of the operating modes being such that the vertical stabilizer 104, depicted in FIG. 2, is illuminated in its entirety. The selection of the operating mode is carried out on the basis of the image data received from the camera 18. Each of the operating modes has such a light output that the entire vertical stabilizer 104 is illuminated despite the rotation of the aircraft vertical stabilizer illumination light 2, as will be exemplarily and schematically described with respect to FIG. 6. The selection of the particular operating mode compensates for the rotation of the aircraft vertical stabilizer illumination light 2 along with the horizontal stabilizer.

The exemplary aircraft vertical stabilizer illumination light 2 is arranged in the horizontal stabilizer 102, depicted in FIG. 2, with the light being coupled out towards the vertical stabilizer 104 through a cover that is substantially flush with the upper surface of the horizontal stabilizer 102 for aerodynamic reasons. The cover of the aircraft vertical stabilizer illumination light 2, which is not shown in FIG. 3, may have a jagged inner structure in order to couple out a large portion of the light emitted by the LEDs. It is pointed out that it is also possible that that the inner surface of the cover is not jagged. The coupling out of the light and the orientation towards the vertical stabilizer 104 can also be achieved in other ways, e.g. via a suitable optical structure for re-directing the light. Analogously, various measures may be taken that the camera 18 is able to capture images of the vertical stabilizer, i.e. that the vertical stabilizer is in the field of view of the camera 18.

FIG. 4 shows a schematic illustration of an alternative combination of an optical system 6 and a LED group 4. This alternative combination is also able to achieve different light outputs for different operating modes and may thus also be used in aircraft vertical stabilizer illumination lights in accordance with exemplary embodiments of the invention.

Figure 4A:
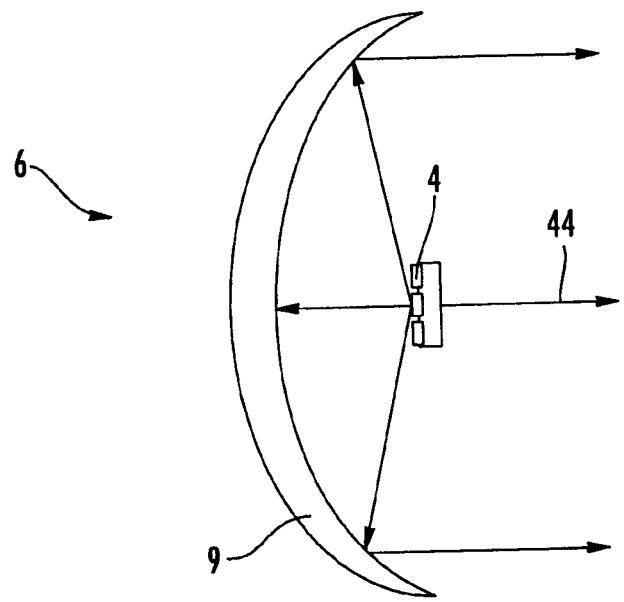
FIG. 4A shows a schematic illustration of a combination of a LED group and an optical system, which can be used in an aircraft vertical stabilizer illumination light in accordance with exemplary embodiments of the invention.
Figure 4B:
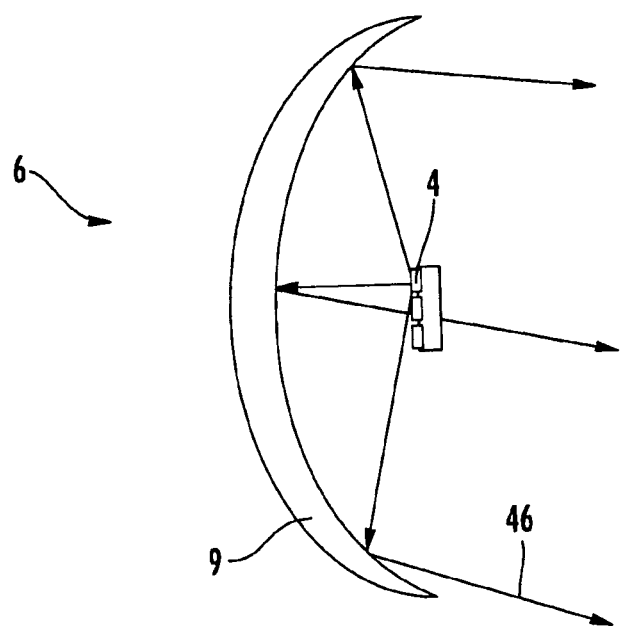
FIG. 4B shows a schematic illustration of a combination of a LED group and an optical system, which can be used in an aircraft vertical stabilizer illumination light in accordance with exemplary embodiments of the invention.
Figure 4C:
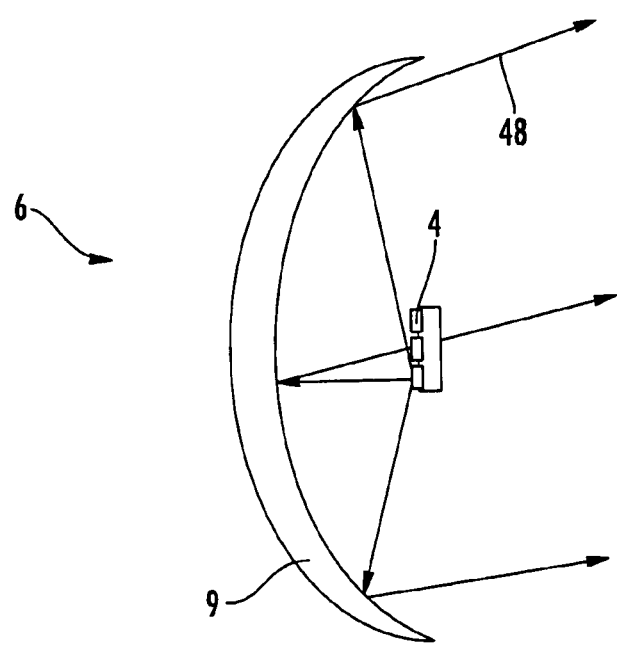
FIG. 4C shows a schematic illustration of a combination of a LED group and an optical system, which can be used in an aircraft vertical stabilizer illumination light in accordance with exemplary embodiments of the invention.

In FIG. 4, the optical system 6 consists of a reflector 9, which is a collimating parabolic reflector with free-form elements in the exemplary embodiment of FIG. 4. The center LED of the LED group 4 is arranged in the focal point of the reflector 9, leading to a collimated light output in a direction 44 in a first illustrative operating mode (FIG. 4A), wherein the center LED is switched on. The top and bottom LEDs of the LED group 4 are arranged at a distance from the focal point of the reflector 9, such that the switching on of the top LED or of the bottom LED of the LED group 4 results in an illustrative light output that is angled towards the bottom (in a direction 46 in FIG. 4B) or angled towards the top (in a direction 48 in FIG. 4C) and has a somewhat wider, but still narrow opening angle.

Again, it can be seen that the selective switching of different LEDs of the LED group 4 leads to different contributions to the overall output light intensity distribution of the aircraft vertical stabilizer illumination light 2. It is again apparent that a wide variety of operating modes, having different output light intensity distributions, can be achieved via the switching of different sets of LEDs.

It is pointed out that the optical system 6 may comprise multiple elements, that the optical system 6 may comprise a combination of one or more lenses and/or one or more reflectors, and that the lenses and reflectors may be non-collimating lenses and non-collimating reflectors, depending on the output light intensity distributions that are to be achieved in the different operating modes. It is further pointed out that larger numbers of operating modes may be achieved with larger numbers of LEDs, in particular with two-dimensional arrangements of LEDs having a large number of LEDs. The principles illustrated in FIGS. 3 and 4 may be extended to more complex LED arrangements within the aircraft vertical stabilizer illumination light 2.

It is further pointed out that the group of LEDs may comprise two or more sub-groups of LEDs, with each sub-group of LEDs having its own optical subsystem associated therewith. For example, the aircraft vertical stabilizer illumination light 2 may have multiple optical arrangements, each optical arrangement consisting of a lens 8 and one or more LED(s) 4, as depicted in FIG. 3, or of a reflector 9 and one or more LED(s) 4, as depicted in FIG. 4. It is also possible that each LED of the group of LEDs has its own optical sub-system associated therewith, as will be described with respect to FIG. 5.

Figure 5:
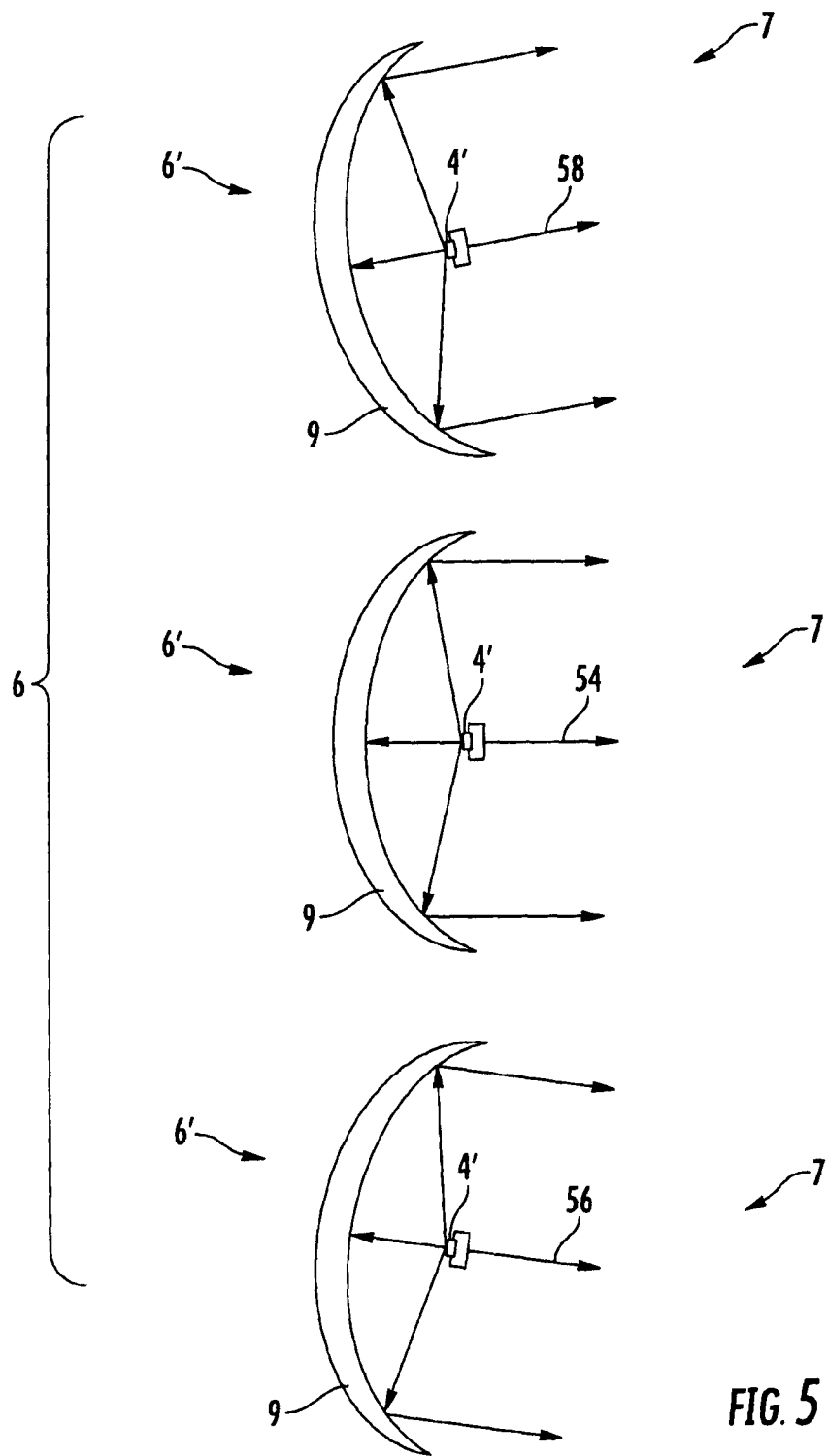
FIG. 5 shows a schematic illustration of multiple optical arrangements respectively comprising a LED and an optical sub-system, which can be used in an aircraft vertical stabilizer illumination light in accordance with exemplary embodiments of the invention.

FIG. 5 shows a schematic illustration of a plurality of optical arrangements 7, each of which having a LED 4' and an optical sub-system 6'. Each of the optical sub-systems 6' consists of a reflector 9. The optical sub-systems 6' together form the optical system 6. The optical arrangements 7 are of the same configuration, but are angled with respect to each other. While the optical arrangement 7 depicted in the center provides for light output generally in a direction 54 towards the right in the drawing plane of FIG. 5, the optical arrangements 7 depicted in the top and bottom provide for light output generally in directions 56, 58 angled towards the bottom and to the top from the direction 54 in the drawing plane of FIG. 5. While FIG. 5 is highly schematic in nature, it illustrates that multiple optical arrangements may be provided for generating separate light outputs in distinct directions and that desired overall light outputs may be generated by operating selected ones of the multiple optical arrangements. The individual optical arrangements can have a very well-defined individual light output due to their low complexity and size.

Figure 1:
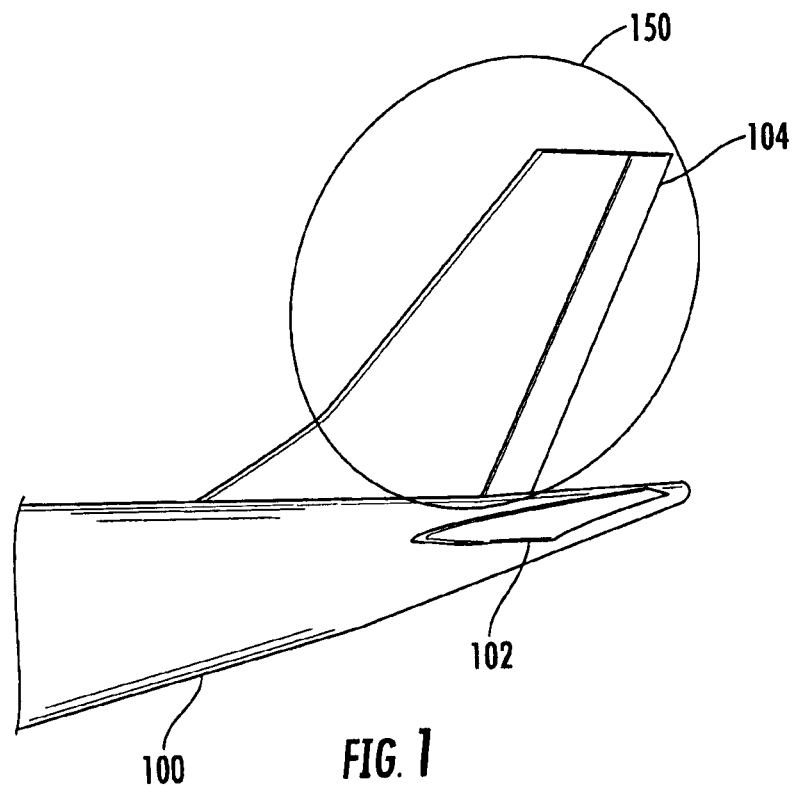
FIG. 1 shows an aircraft tail in a side view, with the vertical stabilizer being illuminated by a prior art light unit.
Figure 6A:
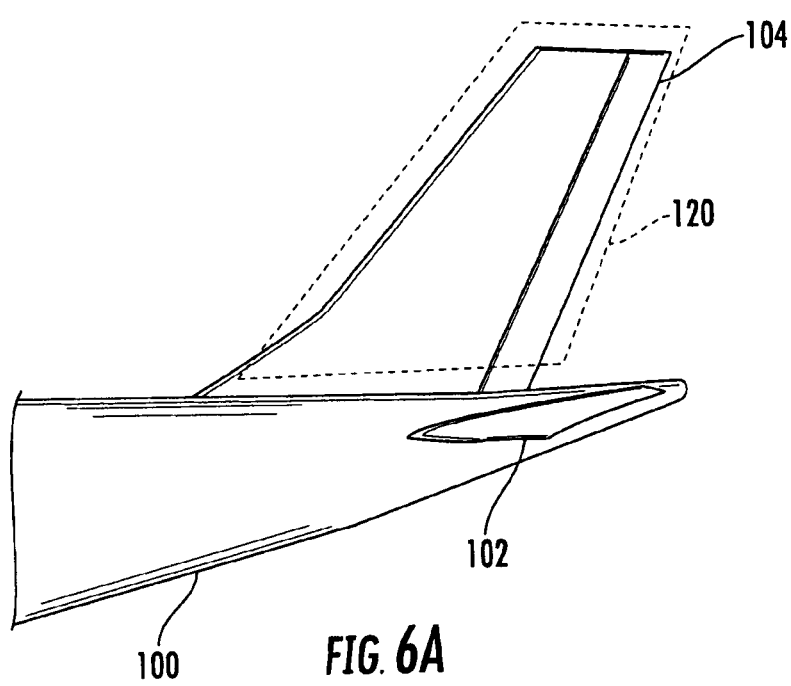
FIG. 6A shows an aircraft tail in a side view, with the vertical stabilizer being illuminated by an aircraft vertical stabilizer illumination light in accordance with exemplary embodiments of the invention in one operating mode.
Figure 6B:
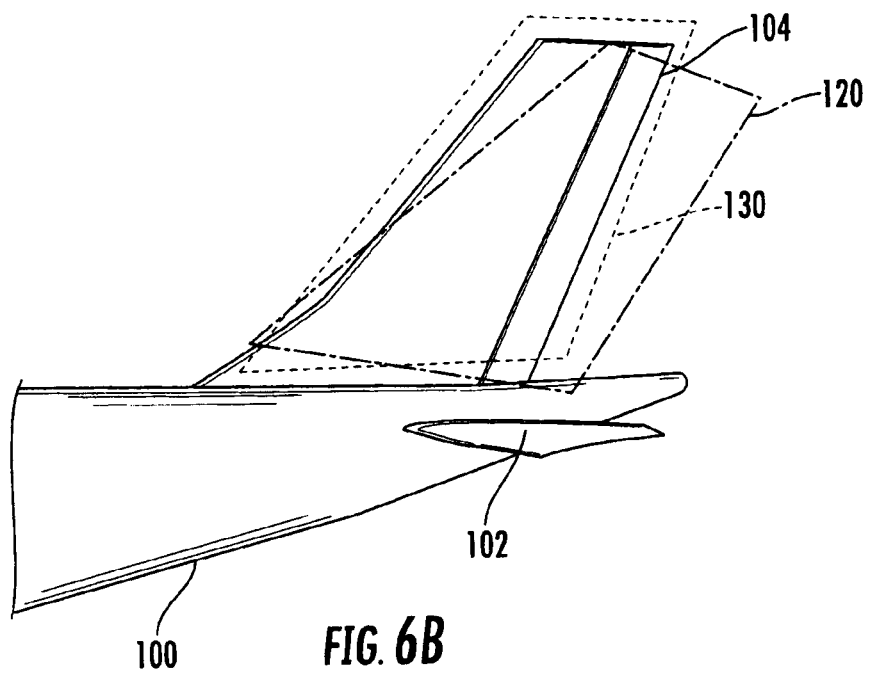
FIG. 6B shows an aircraft tail in a side view, with the vertical stabilizer being illuminated by an aircraft vertical stabilizer illumination light in accordance with exemplary embodiments of the invention in one operating mode.
Figure 6C:
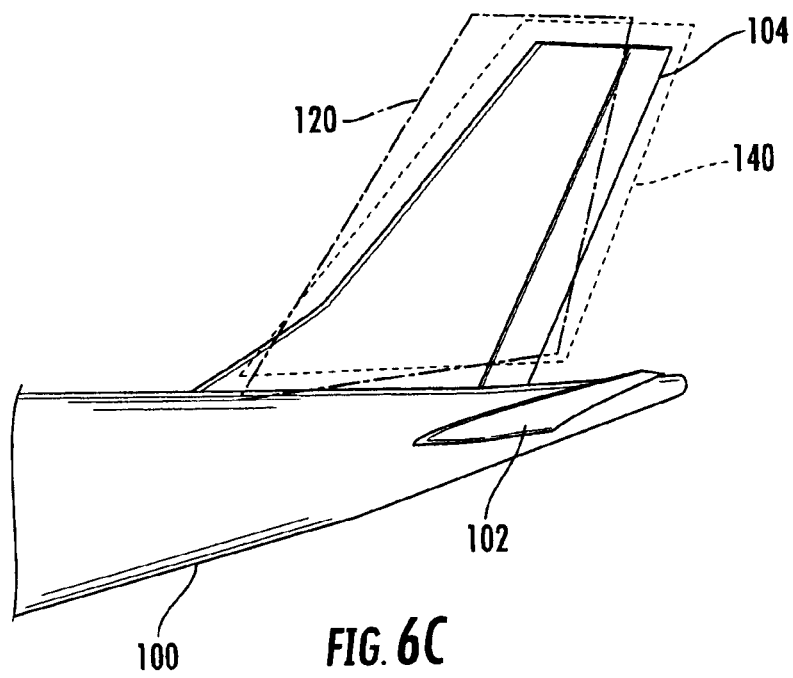
FIG. 6C shows an aircraft tail in a side view, with the vertical stabilizer being illuminated by an aircraft vertical stabilizer illumination light in accordance with exemplary embodiments of the invention in one operating mode.

The operation of the exemplary aircraft vertical stabilizer illumination light 2, depicted in FIGS. 2 and 3, is now described in terms of the resulting illumination of the vertical stabilizer with respect to FIG. 6. In FIG. 6, an aircraft tail is shown in a side view, similar to FIG. 1, with the vertical stabilizer 104 being illuminated by an aircraft vertical stabilizer illumination light 2 in accordance with an exemplary embodiment of the invention. The resulting illumination is shown for three operating modes in FIGS. 6A, 6B, and 6C. An exemplary mechanism of selecting a suitable one of the operating modes will be described further down with respect to FIGS. 8, 9, and 10.

In FIG. 6A, the rotatable horizontal stabilizer 102 is shown in a reference position. In the exemplary embodiment of FIG. 6A, the reference position of the rotatable horizontal stabilizer 102 is the position that is used for the cruise flight of an aircraft at the cruise altitude. The rotation angle of the rotatable horizontal stabilizer 102 is defined to be 0° in the reference position. It is pointed out that another position of the rotatable horizontal stabilizer 102 can be defined as the reference position.

The aircraft vertical stabilizer illumination light 2 emits light in a first operating mode, also referred to as reference operating mode, when the horizontal stabilizer 102 is in the reference position. The area illuminated in the reference operating mode is indicated with a dashed line, indicated with reference numeral 120. It can also be said that reference numeral 120 refers to the light output of the reference operating mode, with the extension of the light output 120 being shown in comparison with the extension of the vertical stabilizer 104, which coincides with or is parallel to the flight direction of the aircraft. In other words, the light output is depicted as being projected onto a vertical plane through the vertical stabilizer 104. The light output 120 illuminates substantially the entire vertical stabilizer 104 and extends somewhat beyond the front, top and aft edges of the vertical stabilizer 104.

In FIG. 6B, the horizontal stabilizer 102 is shown rotated towards the back of the aircraft 100. This rotation towards the back is defined as a positive rotation angle. As a response to this rotation angle of the horizontal stabilizer 102, the aircraft vertical stabilizer illumination light 2 selects a second operating mode, which results in a second light output 130, indicated with dashed lines and again projected onto the vertical plane through the vertical stabilizer 104. The second light output 130 again illuminates substantially the entire vertical stabilizer 104 and extends somewhat beyond the front, top and aft edges of the vertical stabilizer 104.

When looked at in the aircraft frame of reference, the illumination of the vertical stabilizer 104 via the second light output 130, depicted in FIG. 6B for the rotated horizontal stabilizer 102, is substantially the same as the illumination of the vertical stabilizer 104 via the first light output 120, depicted in FIG. 6A for the non-rotated horizontal stabilizer 102. In other words, the aircraft vertical stabilizer illumination light 2 adjusts its light output in such a way that it compensates for the rotation of the rotatable horizontal stabilizer 102 and in such a way that a continuing illumination of the vertical stabilizer 104 is achieved.

While the illumination of the vertical stabilizer 104 stays substantially the same, it is pointed out that the output light intensity distributions of the first and second operating modes are different in the light unit frame of reference. This is illustrated in FIG. 6B as follows. If the aircraft vertical stabilizer illumination light 2 were to be operated in the first operating mode and were to emit the first light output, although the horizontal stabilizer 102 is rotated towards the back of the aircraft, this first operating mode would lead to an illuminated area 120, depicted in dashed/dotted lines. As can be seen, the illuminated area 120 would only have a limited overlap with the vertical stabilizer 104. Accordingly, a large portion of the vertical stabilizer 104 would not be illuminated. In addition, a large portion of the light, which were emitted by the aircraft vertical stabilizer illumination light 2, when operated in the first operating mode, would pass the vertical stabilizer 104 and would not contribute to the illumination thereof. In particular, much of the emitted light would pass the vertical stabilizer 104 at its aft side.

The projection of the first light output onto the vertical plane of the vertical stabilizer, as depicted in FIG. 6A for the un-rotated horizontal stabilizer, is substantially the same as the projection of the second light output onto the vertical plane of the vertical stabilizer, as depicted in FIG. 6B for the rotated horizontal stabilizer. However, it is pointed out that these two projections may be different as well. In particular, different portions of the vertical stabilizer may be illuminated and/or different extensions of the illuminated area beyond the edges of the vertical stabilizer may be present in the different operating modes.

In FIG. 6C, the horizontal stabilizer 102 is shown rotated towards the front of the aircraft 100. This rotation towards the front is defined as a negative rotation angle. As a response to this rotation angle of the horizontal stabilizer 102, the aircraft vertical stabilizer illumination light 2 selects a third operating mode, which results in a third light output 140, indicated with dashed lines and again projected onto the vertical plane through the vertical stabilizer 104. The third light output 140 again illuminates substantially the entire vertical stabilizer 104 and extends somewhat beyond the front, top and aft edges of the vertical stabilizer 104.

Again, in order to illustrate the adjustment by the aircraft vertical stabilizer illumination light 2, the hypothetical case of the first operating mode being selected and the first light output 120 being emitted is shown in FIG. 6C. The projection of the first light output 120 onto the vertical plane through the vertical stabilizer is indicated via the dashed/dotted lines around the area illuminated by the first light output 120. It can again be seen that the adjusted output light intensity distribution illuminates substantially the entire vertical stabilizer 140, while a non-adjusted output light intensity distribution would leave a large portion of the vertical stabilizer 104 non-illuminated.

While three operating modes are shown and described with respect to FIGS. 6A, 6B and 6C for the purpose of illustration, the aircraft vertical stabilizer illumination light may have more operating modes. In other words, the aircraft vertical stabilizer illumination light may not only have a reference operating mode and one operating mode for a positive/negative rotation angle, as described with respect to FIGS. 6A, 6B and 6C. It may have multiple operating modes for both a variety of different positive rotation angles and a variety of different negative rotation angles. The response to the received image data of the vertical stabilizer may have different levels of granularity, which may depend on the particular type of aircraft.

Figure 7:
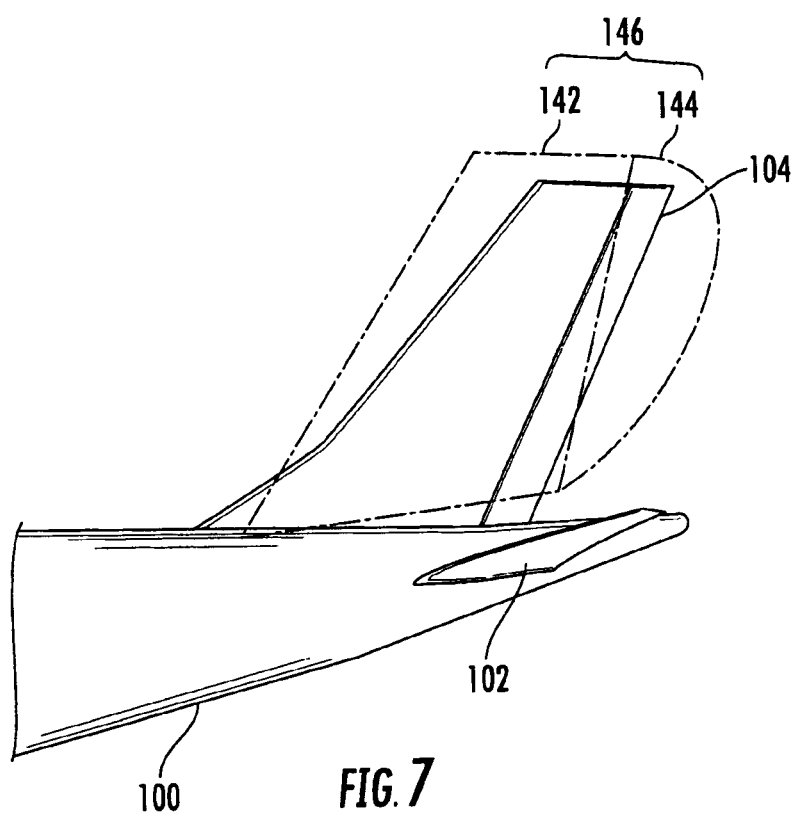
FIG. 7 shows an aircraft tail in a side view, with the vertical stabilizer being illuminated by an aircraft vertical stabilizer illumination light in accordance with exemplary embodiments of the invention in another operating mode.

FIG. 7 shows another exemplary operating mode that may be employed by an aircraft vertical stabilizer illumination light in accordance with an exemplary embodiment of the invention. This other exemplary operating mode is again depicted in terms of the resulting light output. In particular, the depicted operating mode of FIG. 7 is a possible alternative for the third operating mode, described above with respect to FIG. 6C, and may be employed when the horizontal stabilizer 102 is rotated towards the front of the aircraft 100.

In the depicted exemplary operating mode of FIG. 7, the aircraft vertical stabilizer illumination light 2 has a composite light output 146. A main portion 142 of the composite light output 146 corresponds to the first light output 120, described above with respect to FIG. 6A. This first light output 120 is also shown in FIG. 6C for comparative purposes. A rearward portion 144 of the composite light output 146 illuminates the tail end of the vertical stabilizer 104 that is not covered by the main portion 142 due to the rotation of the horizontal stabilizer 102. In other words, the aircraft vertical stabilizer illumination light 2 of the exemplary embodiment of FIG. 7 switches on additional LEDs, in case the horizontal stabilizer rotates towards the front of the aircraft 100.

It is pointed out that the aircraft vertical stabilizer illumination light 2 may operate in an analogous manner for a backwards rotation of the horizontal stabilizer 102, as for example shown in FIG. 6B. In particular, it is possible that another composite light output is provided in that case, having the main portion 142, which then illuminates a rear part of the vertical stabilizer 104, and a forwards portion, which illuminates a front end of the vertical stabilizer. Also in that case, the aircraft vertical stabilizer illumination light 2 switches on additional LEDs, in case the horizontal stabilizer rotates towards the back of the aircraft 100. The additional LEDs for the rearward portion 146 of the composite light output 142 and the forward portion of the other composite light output, described above, may share an optical sub-system, in particular an optical sub-system with two or more focal points.

FIG. 8 illustrates exemplary image data analysis, as may be carried out by an aircraft vertical stabilizer illumination light in accordance with an exemplary embodiment of the invention. The image data analysis is performed for extraction of information from the image data, which information may be used in the control of the aircraft vertical stabilizer illumination light, in particular in the selection of the particular operating mode. FIG. 8 shows an exemplary sequence of image data analysis for the situation of the horizontal stabilizer being in a reference position, i.e. in a cruise flight position or on the ground.

Figure 8A:
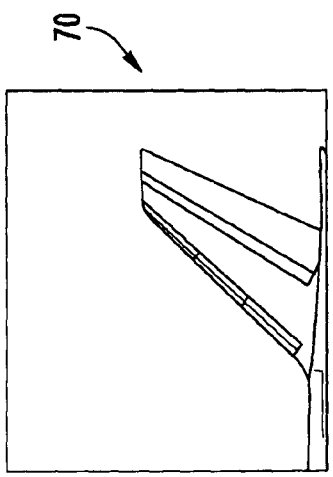
FIG. 8A illustrates a portion of an exemplary image data analysis, which can be carried out by an aircraft vertical stabilizer illumination light in accordance with exemplary embodiments of the invention, for a reference position of the horizontal stabilizer.
Figure 8B:
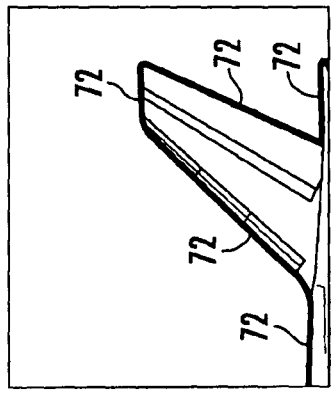
FIG. 8B illustrates a portion of an exemplary image data analysis, which can be carried out by an aircraft vertical stabilizer illumination light in accordance with exemplary embodiments of the invention, for a reference position of the horizontal stabilizer.
Figure 8C:
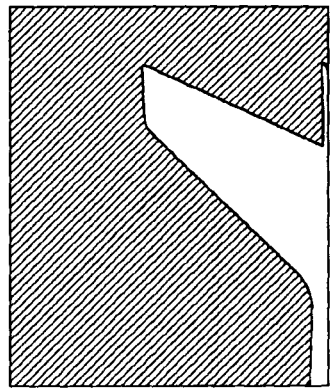
FIG. 8C illustrates a portion of an exemplary image data analysis, which can be carried out by an aircraft vertical stabilizer illumination light in accordance with exemplary embodiments of the invention, for a reference position of the horizontal stabilizer.

FIG. 8A depicts the image as captured by the image generator, e.g. by the camera, of the aircraft vertical stabilizer illumination light. In other words, FIG. 8A depicts a representation of the image data 70, provided by the camera. FIG. 8A depicts the vertical stabilizer, an upper edge of the aircraft fuselage, and a portion of sky around the vertical stabilizer. According to an exemplary embodiment of the invention, edge detection is performed on the image data underlying the image of FIG. 8A. According to the exemplary embodiment of FIG. 8, the edge detection detects the border between the aircraft structure and the sky. In particular, the edge detection detects the upper edge of the aircraft fuselage in front of the vertical stabilizer, the front edge of the vertical stabilizer, the top edge of the vertical stabilizer, the rear edge of the vertical stabilizer, and the upper edge of the aircraft fuselage aft of the vertical stabilizer. All of these detected edges are detected objects, referred to with reference numeral 72. The resulting contour/outline along the aircraft structure is shown as a bold line in FIG. 8B. In particular, FIG. 8B shows the image of FIG. 8A, overlaid by the detected contour/outline around the aircraft structure. As a next step, the position and orientation of the detected edges is extracted. The remainder of the image data may be discarded at this point in time. This is illustrated by FIG. 8C where the image of FIG. 8A is shown in a highly schematic manner, indicating only which parts of the image are within the detected contour and which parts of the image are outside the detected contour. In this way, a reference set of detected edges for the reference position of the horizontal stabilizer is determined. It is also possible to represent this reference set of detected edges in another way, such as in a data base description of the positions, lengths, and orientations of the detected edges. The detected edges are examples of detected objects 72.

Figure 9A:
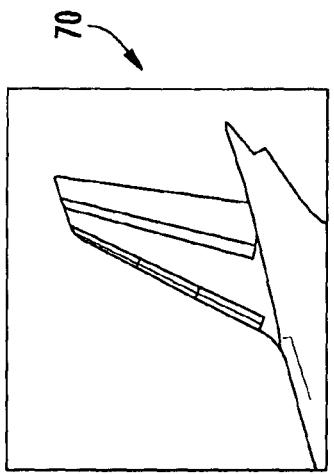
FIG. 9A illustrates a portion of an exemplary image data analysis, which can be carried out by an aircraft vertical stabilizer illumination light in accordance with exemplary embodiments of the invention, for a rotated position of the horizontal stabilizer.
Figure 9B:
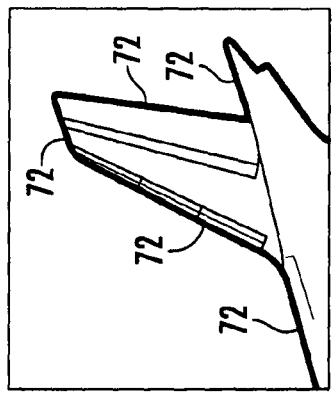
FIG. 9B illustrates a portion of an exemplary image data analysis, which can be carried out by an aircraft vertical stabilizer illumination light in accordance with exemplary embodiments of the invention, for a rotated position of the horizontal stabilizer.
Figure 9C:
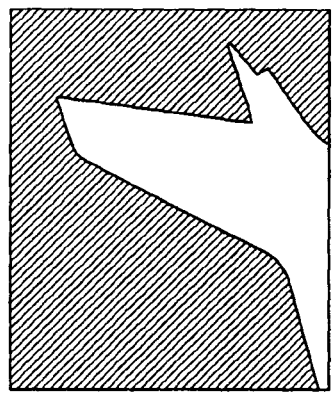
FIG. 9C illustrates a portion of an exemplary image data analysis, which can be carried out by an aircraft vertical stabilizer illumination light in accordance with exemplary embodiments of the invention, for a rotated position of the horizontal stabilizer.

FIG. 9 illustrates further exemplary image data analysis, as may be carried out by an aircraft vertical stabilizer illumination light in accordance with an exemplary embodiment of the invention. FIG. 9 shows an exemplary sequence of image data analysis for the situation of the horizontal stabilizer being rotated towards the back of the aircraft, as e.g. depicted in FIG. 6B. In FIG. 9, the sequence of image data analysis is analogous to the sequence of image data analysis shown in FIG. 8. However, as the horizontal stabilizer is rotated towards the back of the aircraft, the camera captures a different image, i.e. different image data 70. In particular, as seen from the camera, the tail is raised up as compared to the remainder of the fuselage of the aircraft. The upper edge of the aircraft fuselage is shown as running from close to the left bottom corner of the image in an upwards right direction. Via the image processing steps described above with respect to FIG. 8, a set of detected edges for the current position of the horizontal stabilizer is determined. The position and orientation of this set of detected edges is depicted in FIG. 9B, overlaid over the image of FIG. 9A, and in FIG. 9C in a reduced, schematic manner. Again, the detected edges are detected objects 72. The position and orientation of the detected edges of FIG. 9C may be used together with the detected edges of FIG. 8C, which may for example be available from a memory of the controller, for selecting a suitable operating mode of the aircraft vertical stabilizer illumination light.

The edge detection, as illustratively described with respect to FIGS. 8 and 9, may be carried out via the Canny algorithm, via the Sobel operator, or via the Laplace filter, or in any suitable manner.

Figure 10:
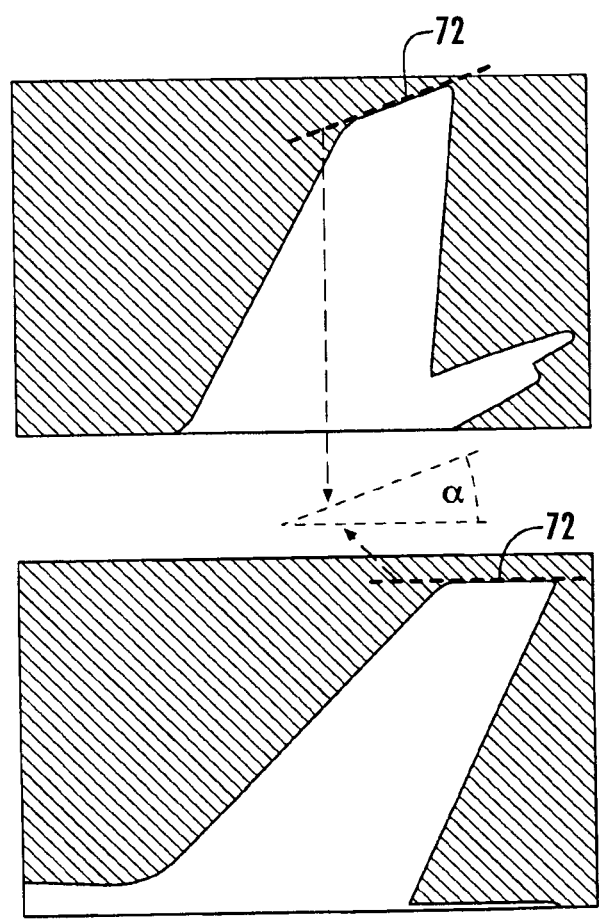
FIG. 10 illustrates the determination of a rotation angle indication on the basis of the analyzed image data of FIGS. 8 and 9, which can be carried out by an aircraft vertical stabilizer illumination light in accordance with exemplary embodiments of the invention.

FIG. 10 illustrates the determination of a rotation angle indication on the basis of the detected edges of FIGS. 8 and 9. In particular, FIG. 10 depicts the representation of the detected edges of the reference position of FIG. 8C in the bottom portion and the representation of the detected edges for the backwards rotated horizontal stabilizer of FIG. 9C in the top portion. According to the exemplary embodiment of FIG. 10, the top edge of the vertical stabilizer is the detected object 72 that forms the basis for the selection of the particular operating mode. In particular, the orientation of the top edge of the vertical stabilizer forms the basis for the selection of the particular operating mode. Further in particular, the angle a between the reference orientation, which is almost horizontal as depicted in the bottom portion of FIG. 10, and the orientation in the current image data, which is upwards from left to right as depicted in the top portion of FIG. 10, forms a measure for the relative positioning of the aircraft vertical stabilizer illumination light and the vertical stabilizer. In particular, the angle a is an indication for the rotation angle of the horizontal stabilizer. While the angle a may correspond directly to the rotation angle of the horizontal stabilizer, it is also possible that some trigonometric relationship or other transformation exists between the angle a and the rotation angle of the horizontal stabilizer. In any case, the angle a is an indication for the rotation angle of the horizontal stabilizer. Based on this indication, the controller of the aircraft vertical stabilizer illumination light selects a suitable operating mode and, thus, a suitable light output for illuminating the vertical stabilizer. The correspondence between the angle a and the suitable operating mode may be extracted from a look-up table or a mapping function or any other suitable correspondence mechanism.

It is pointed out that, while edge detection and the determination of angle variations in the orientation of detected edges is an efficient way of selecting a suitable operating mode, other suitable image analysis may be carried out as well. In particular, it is possible to detect a particular color and/or a particular shape, such as an airline logo, in the image data and to base the selection of the particular operating mode thereon.

Using image data as the basis for selecting the particular operating mode may also allow for using an aircraft vertical stabilizer illumination light on a variety of aircraft types without or with little previous programming. In particular, it is possible that the aircraft vertical stabilizer illumination light is configured to detect the area of the vertical stabilizer in the image data and to switch on those LEDs, whose light output corresponds to the direction of the area of the vertical stabilizer. This configuration may work particularly well with the provision of a comparably high number of LEDs, each having a particularly strong collimation of its individual light output in a certain direction. Each LED may be associated with a particular area in the image data, as captured by the image generator, and may be switched on/off depending on whether the particular area is part of the area of the vertical stabilizer.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

The invention claimed is:

1. An aircraft vertical stabilizer illumination light, configured for being arranged in a rotatable horizontal stabilizer of an aircraft and for being oriented towards a vertical stabilizer of the aircraft for illuminating the vertical stabilizer, comprising:

a LED group, comprising a plurality of LEDs, an optical system, comprising at least one optical element, the optical system being associated with the LED group for shaping a light output from the light emitted by the LED group, an image generator, arranged within the aircraft vertical stabilizer illumination light for being oriented towards the vertical stabilizer, the image generator being configured to provide image data of the vertical stabilizer, and a controller, coupled to the image generator for receiving the image data, wherein the controller is configured to operate the aircraft vertical stabilizer illumination light in a plurality of operating modes, with different sets of the plurality of LEDs being switched on in the plurality of operating modes and with different light outputs being emitted by the aircraft vertical stabilizer illumination light in the plurality of operating modes, wherein the controller comprises an object detection unit configured to detect at least one object in the image data received and wherein the object detection unit is configured to detect a rotation angle indication ($\alpha$) from the detected at least one object, the rotation angle indication ($\alpha$) indicating a rotation angle of the rotatable horizontal stabilizer, and wherein the controller is configured to select a particular operating mode in response to the rotation angle indication ($\alpha$) indicating the rotation angle of the rotatable horizontal.

2. The aircraft vertical stabilizer illumination light according to claim 1, wherein the image generator comprises a camera.

3. The aircraft vertical stabilizer illumination light according to claim 1, wherein the image generator comprises at least one of a laser scanner and an ultrasonic scanner.

4. The aircraft vertical stabilizer illumination light according to claim 1, wherein the object detection unit is configured to perform edge detection on the image data received, in particular edge detection on the basis of at least one of a Canny algorithm, a Sobel operator, and a Laplace filter.

5. The aircraft vertical stabilizer illumination light according to claim 1, wherein the object detection unit is configured to determine the rotation angle indication ($\alpha$) on the basis of the position and/or orientation of the at least one object in the image data with respect to a reference position and/or a reference orientation of the at least one object in reference image data.

6. The aircraft vertical stabilizer illumination light according to claim 1, wherein the controller is configured to select the particular operating mode in such a way that substantially the entire vertical stabilizer of the aircraft is illuminated for a given rotation angle of the rotatable horizontal stabilizer within a predefined rotation angle range.

7. The aircraft vertical stabilizer illumination light according to claim 6, wherein the predefined rotation angle range covers an angular range of at least 10°, in particular an angular range of between 10° and 20°.

8. The aircraft vertical stabilizer illumination light according to claim 1, having one optical system associated with the plurality of LEDs, with individual light outputs by the plurality of LEDs being affected differently by the one optical system due to their different positioning with respect thereto.

9. The aircraft vertical stabilizer illumination light according to claim 1, having a plurality of optical arrangements, with each optical arrangement comprising at least one of the plurality of LEDs and an associated optical sub-system and with at least some of the plurality of optical arrangements having differing orientations towards the vertical stabilizer and being independently operable.

10. An aircraft, having in a tail portion of the aircraft a vertical stabilizer, a left rotatable horizontal stabilizer and a right rotatable horizontal stabilizer, wherein each of the left rotatable horizontal stabilizer and the right rotatable horizontal stabilizer comprises an aircraft vertical stabilizer illumination light according to claim 1, oriented towards the vertical stabilizer for illumination thereof.

11. A method of operating an aircraft vertical stabilizer illumination light, installed in a rotatable horizontal stabilizer of an aircraft for illuminating a vertical stabilizer of the aircraft, the method comprising the steps of:

generating image data of the vertical stabilizer, and detecting at least one object in the image data received, determining a rotation angle indication ($\alpha$) from at least one object, the rotation angle indication indicating a rotation angle of the rotatable horizontal stabilizer, selecting a particular operating mode of the aircraft vertical stabilizer illumination light in response to the rotation angle indication indicating the rotation angle of the rotatable horizontal stabilizer, the particular operating mode being selected from a plurality of operating modes, with different light outputs being emitted by the aircraft vertical stabilizer illumination light in the plurality of operating modes.

12. The method according to claim 11, wherein said determining of the rotation angle indication comprises a relating of the position and/or orientation of the at least one object with a reference position and/or a reference orientation of the at least one object in reference image data.

* * * * *